W. H. BANFIL.

CHEMICAL FIRE EXTINGUISHER.

APPLICATION FILED MAY 22, 1919.

Reissued Nov. 18, 1919.

14,753.

Inventor.
William H. Banfil
by Heard Smith & Tennant.
Attys.

UNITED STATES PATENT OFFICE.

WILLIAM H. BANFIL, OF WATERTOWN, MASSACHUSETTS.

CHEMICAL FIRE-EXTINGUISHER.

14,753. Specification of Reissued Letters Patent. Reissued Nov. 18, 1919.

Original No. 1,298,157, dated March 25, 1919, Serial No. 247,132, filed July 29, 1918. Application for reissue filed May 22, 1919. Serial No. 299,045.

*To all whom it may concern:*

Be it known that I, WILLIAM H. BANFIL, a citizen of the United States, residing at Watertown, county of Middlesex, State of Massachusetts, have invented an Improvement in Chemical Fire-Extinguishers, of which the following description, in connection with the accompanying drawings, is a specification, like characters on the drawing representing like parts.

This invention relates to improvements in chemical fire extinguishers of the class in which a reservoir is provided for an alkaline solution and the bottle of acid retained in the reservoir normally in upright position but adapted when the extinguisher is to be used to be inverted and discharge its contents into the alkaline solution thereby to generate a sufficient gas to force the contents of the extinguisher through a suitable nozzle. In such extinguishers a stopper for the acid bottle is provided which normally rests upon the mouth of the bottle and has the stem extending into the neck thereof, means being provided for permitting the stopper to fall away from the mouth of the bottle when the extinguisher is inverted for use. When thus inverted the stopper falls away from the mouth of the bottle and the stem which is more or less withdrawn from the neck of the bottle serves to restrict the flow of acid and also to distribute the same uniformly thereby controlling the generation of gas and causing the generation of gas to proceed with substantial uniformity throughout the area of the reservoir. In fire extinguishers of this class the stopper-distributer usually comprises a mass of porcelain or other vitreous material which is adapted to seat upon the mouth of the bottle the stem being a dependent integral central extension thereof. The stopper-distributer usually is contained in a cage depending from or connected to the cover of the extinguisher and is removed with the cover when the extinguisher is to be refilled.

When the cover is thus removed the stopper falls to the bottom of the cage so that the stem projects and frequently as the cover is being carried aside or laid down the stem is broken or chipped so that when replaced the remainder thereof fails to serve its function of properly seating the stopper upon the mouth of the bottle and when the fire extinguisher is inverted the mutilation or absence of the stem causes failure of proper restriction and distribution of the acid flowing from the bottle. The object of the present invention broadly speaking is to provide a chemical fire extinguisher of the class described with means for insuring proper closure of the acid bottle and proper distribution of the contents of the bottle when the extinguisher is placed in use by inversion. More specifically the object of the invention is to provide the cage for supporting the stopper-distributer with means for preventing the stem of said stopper-distributer from extending beyond the boundary of the cage so that it will be protected from harm. Other objects of the invention will more fully appear from the accompanying description and drawings and will be particularly pointed out in the appended claims.

A preferred embodiment of the invention is illustrated in the accompanying drawings in which.

Figure 1:
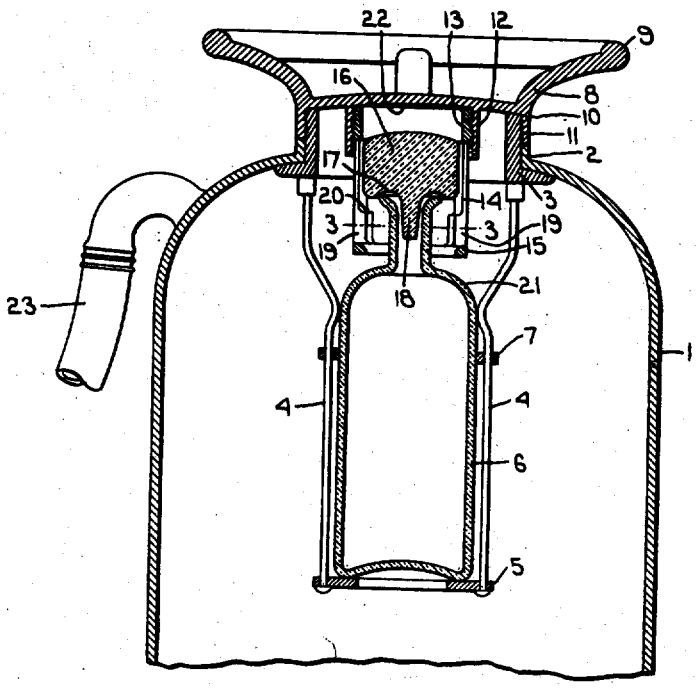
Figure 1 is a vertical longitudinal section of the upper portion of the fire extinguisher illustrating my invention applied therto.
Figure 2:
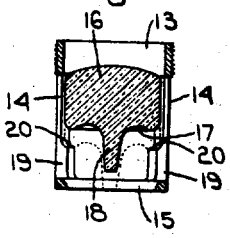
Fig. 2 is a vertical sectional view of the cage and stopper-distributer.
Figure 3:
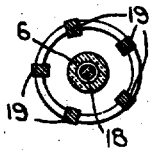
Fig. 3 is a transverse sectional view on the line 3—3 of Fig. 1.

The fire extinguisher illustrated in the accompanying drawings comprises a cylindrical reservoir 1 having a contracted neck portion 2 to which is secured a bottle holder comprising a sleeve 3 having downwardly extended rods 4 supporting at their lower end a base preferably in the form of a ring 5 which serves as a seat for the lower end for the bottom of the bottle 6. A ring 7 may also be secured to the rods 4 intermediate of their length to strengthen the construction of the bottle holder and also provide additional means for engaging the wall of the bottle. The receptacle is provided with a cover 8 having an annular extension 9 adapted to be readily grasped by the hand and is provided with a downwardly extending screw threaded flange 10 which engages suitable screw threads 11 upon the sleeve 3 of the bottle support 4, the end flange 10 preferably abutting against the contracted extension 2 of the reservoir 1. The cover 8 is also provided with a downwardly extending flange 12 provided with means for adjustably and removably supporting the cage for the bottle stopper-distributer. The preferred form of cage illustrated herein comprises a sleeve 13 having screw threads engaging companion screw threads upon the flange 12.

Downwardly depending arms 14 are connected to or preferably formed integral with the sleeve 13 and are connected at their lower ends to a ring 15 which may also conveniently be made integral with the arms 14 and sleeve 13. The stopper-distributer comprises a substantially cylindrical mass 16 of material of considerable weight—preferably vitreous material such as porcelain—and is of such size as to slide readily within the cage formed by the sleeve 13 and downwardly extending guiding arms 14. The stopper-distributer preferably has a concaved or recessed seat 17 adapted to engage and closely seat upon the mouth of the bottle and is also provided with a central downwardly extending stem 18 adapted to enter the mouth of the bottle.

In order to prevent the stem 18 projecting from the cage when the cover is removed, the arms 14 are formed with thickened lower portions 19 presenting shoulders 20 to engage the edge of the seat 17 of the stopper-distributer 16 when the cover is removed from the receptacle but it will be obvious that other means may be provided to accomplish this purpose.

When the extinguisher is to be filled the cover 8 is unscrewed from the bottle support 3 and wholly removed from the extinguisher. An alkaline solution or means to form an alkaline solution is then introduced into the reservoir 1. The acid bottle 6 is likewise removed and filled and then inserted within the bottle support as illustrated in the drawings. The cover is then replaced and screwed down thus permitting the stopper-distributer to rest upon the neck from the mouth of the bottle with its extension 18 projecting into the neck thereof.

When the extinguisher is to be used it is inverted and the bottle 6 falls by gravity until its shoulder 21 engages and rests upon the ring 15 of the cage for the stopper-distributer. The stopper-distributer being of considerable weight continues to descend by gravity until it rests upon the face 22 of the cover 8 at which time the seat 17 is removed from the mouth of the bottle sufficiently to permit the contents of the bottle to flow out. The stem 18 which still projects into the mouth of the bottle serves to distribute the stream which flows from the bottle uniformly into the alkaline solution in the reservoir and also to restrict its flow. By adjusting the sleeve 13 relatively to the flange 12 any desired space may be provided between the seat 17 and the mouth of the bottle when the extinguisher is inverted thereby providing a suitable regulation which will enable the apparatus to generate gas more or less gradually according to the character of the chemicals used or other conditions. The liquid in the reservoir is forced by the pressure of the gas thus generated through the hose 23 which leads from near the bottom of the extinguisher when the latter is inverted and in operative position.

By thus providing means for inclosing and projecting the stem 18 of the stopper-distributer at all times the breaking or injuring of the distributer stem is avoided and the proper operation of the distributer device insured. This is very important for the reason that if the acid is permitted to flow too freely into the alkaline an excessive pressure is generated which will either discharge the contents of the reservoir too quickly or possibly break the reservoir.

It will be understood that the embodiment of the invention disclosed herein is illustrative merely and that various other means may be provided for preventing breakage of or injury to the stem 18 of the stopper-distributer within the meaning and scope of the following claims.

Having fully described my invention what I claim as new and desire to secure by Letters Patent is:

1. A cage for a bottle stopper of a chemical fire extinguisher in which the stopper for the acid bottle is provided with a central distributing stem adapted to enter the neck of the bottle, comprising a sleeve attached to the cover of the extinguisher, a series of depending arms provided at a distance from their ends with shoulders positioned to limit the movement of the stopper and to retain the stem within the boundary of said cage whereby breakage or injury to said stem when the cover is removed from the receptacle or replaced thereon will be avoided.

2. A cage for a bottle stopper of a chemical fire extinguisher in which the stopper for the acid bottle is provided with a central distributing stem adapted to enter the neck of the bottle, comprising a sleeve attached to the cover of the extinguisher, a series of depending arms adapted to guide the stopper-distributer, and means for limiting the movement of the stopper in position to retain the stem thereof within the boundary of said cage, whereby breakage or injury to said stem when the cover is removed from the receptacle or replaced thereon will be avoided.

3. A cage for a bottle stopper of a chemical fire extinguisher in which the stopper for the acid bottle is provided with a central distributing stem adapted to enter the neck of the bottle, comprising a member attached to the cover of the extinguisher, said member provided with means for limiting the movement of the stopper to retain the stem thereof within the boundary of said cage, whereby the stem will be protected from breakage or injury, said stopper being freely slidable within the cage, the cage and stopper being removable from the extinguisher without removing the acid bottle.

4. A cage for a bottle stopper of a chemical fire extinguisher in which the stopper for the acid bottle is provided with a central distributing stem adapted to enter the neck of the bottle, comprising a member adapted to inclose the neck of the bottle, having means for detachably securing the same to the cover of the extinguisher, said member so constructed as to limit the movement of the stopper and retain the stem thereof within the boundary of said cage whereby the said stem will be protected from breakage or injury, said stopper being freely slidable within the cage, the cage and stopper being removable from the extinguisher without removing the acid bottle.

5. A cage for a bottle stopper of a chemical fire extinguisher in which the stopper for the acid bottle is provided with a central distributing stem adapted to enter the neck of the bottle, comprising a depending member adapted to inclose the neck of the bottle, said depending member so constructed as to limit the movement of the stopper and retain the stem thereof within the boundary of said cage whereby the said stem will be protected from breakage or injury, said stopper being freely slidable within the cage, the cage and stopper being removable from the extinguisher without removing the acid bottle.

6. A cage for a bottle stopper of a chemical fire extinguisher in which the stopper for the acid bottle is provided with a central distributing stem adapted to enter the neck of the bottle, comprising a member adapted to inclose the neck of the bottle, having means for detachably securing the same to the cover of the extinguisher, means on said member with which the stopper is adapted to come in contact to limit the movement of the stopper and retain the stem thereof within the boundary of said cage whereby the said stem will be protected from breakage or injury, said stopper being freely slidable within the cage, the cage and stopper being removable from the extinguisher without removing the acid bottle.

WILLIAM H. BANFIL.